United States Patent [19]
Gordon

[11] 4,307,937
[45] Dec. 29, 1981

[54] OPTICAL MODULATORS
[75] Inventor: Kevin S. Gordon, Kanata, Canada
[73] Assignee: Northern Telecom Limited, Montreal, Canada
[21] Appl. No.: 44,856
[22] Filed: Jun. 4, 1979
[51] Int. Cl.³ .............................................. G02B 5/14
[52] U.S. Cl. ............................... 350/96.29; 350/96.15
[58] Field of Search ............... 350/96.15, 96.29, 353; 350/359

[56] References Cited
U.S. PATENT DOCUMENTS

| | | | |
|---|---|---|---|
| 3,166,673 | 1/1965 | Vickery et al. | 331/94.5 C |
| 3,466,565 | 9/1969 | Rigrod | 331/94.5 C |
| 3,619,032 | 11/1971 | Reizman | 350/360 |
| 3,775,699 | 11/1973 | Cassels | 331/94.5 C |
| 4,053,764 | 10/1977 | Sierak et al. | 350/96.15 |

Primary Examiner—John K. Corbin
Assistant Examiner—Rodney B. Bovernick
Attorney, Agent, or Firm—Stuart L. Wilkinson

[57] ABSTRACT

An optical modulator has two closely spaced optical fibre end surfaces, the optical path length between which can be altered in response to an applied modulating signal. Light is partially reflected from the two surfaces, the two beams interfering according to their phase difference. Alternatively the modulator may be operated in a transmissive mode. To obtain modulation either the refractive index of material between the fibre end surfaces is altered or one of the fibres is longitudinally vibrated. A method of operating a modulator in a wavelength selective mode is also described.

12 Claims, 7 Drawing Figures

OPTICAL MODULATORS

This invention relates to optical modulators useful generally as sensors and particularly applicable to fibre optic telecommunication systems.

Optical fibres are used in telecommunication trunks to take advantage of their high bandwidth. They have not been so readily accepted in a subscriber's loop. One problem with using a fibre optic link in subscriber's line is the requirement for sufficient power from the central office to activate the telephone ringer. Recently developed photodiodes and transducers are sufficiently efficient to power a ringer using light transmitted along a fibre. In addition, it has been realized that the markets for home video and information services are growing and these markets require a bandwidth far higher than that provided by a wire pair. These advances have improved the prospect of optical fibres being incorporated in subscriber's line.

In fibre optic trunks, light is coupled into a fibre from a semiconductor laser or a light emitting diode and is detected at the other end of a link using a photodetector. A modulating signal, for example, a PCM signal is applied to the LED or laser to appropriately vary the device output.

In a subscriber's loop, one modulating signal available for application to the light source is a voice frequency signal corresponding to the voice of a called or calling party. With conventional technology the light source might be operated by obtaining an electrical signal using, say, an electret microphone and then applying the signal to the LED or laser to modulate its output.

In co-pending application Ser. No. 947,560, there is described a method of remotely modulating a semiconductor laser using the phenomenon of self-coupling known to occur in semiconductor lasers. A laser is sited at the central office to direct light along the subscriber's line. The subscriber's telephone microphone houses a reflector mounted to undergo vibratory motion in response to voice frequency pressure changes. The reflecting face is parallel to and spaced from the end of the subscriber's fibre line. Continuous wave light is launched from the laser into the central office end of the fibre. Light is partially reflected both internally, from the opposite end face of the subscriber's fibre line, and externally, from the reflector. By varying the gap between the two reflecting surfaces, modulation of the reflected light is obtained. Reflected light, propagating back along the fibre line, is directed back into the laser to induce self-coupling. Lasing activity is consequently altered and light output from another facet of the laser corresponding to the voice frequency input to the microphone is guided through switching equipment and fibre optic trunks to the other party to the telephone conversation.

There are many ways in which the optical path links between two reflecting surfaces can be altered to obtain such modulation.

Broadly, the present invention utilizes interference in order to modulate light in a fibre optic telecommunication system. A beam of light is separated into two parts, follows different paths, and then brought back to form a single beam. The two beams constructively or destructively interfere, depending on their phase difference which itself depends on the optical lengths of the two paths. The optical path length is measured by the product of geometrical distance and refractive index of the material through which the light travels. Interference only occurs where the light beams are coherent; i.e. there is a definite phase relationship existing between radiation at different positions along their paths. One or both of the fibre ends can be coated with dielectric layers to produce wavelength selectivity.

In its broadest aspect the present invention comprises an optical modulator suitable for a fibre optic telecommunications system, said modulator comprising a pair of contiguous facing, closely spaced, parallel optical fibre ends and means for altering the optical path length between the fibre ends.

The optical path length is the product of the refractive index of material in a space between the fibre ends, and the geometrical path length so either or both the refractive index and geometrical path length may be altered in order to alter the optical path length.

The geometrical path length can be altered in a number of ways. For example, one of the fibres can be secured to a membrane, the membrane mounted to undergo vibration in response to voice frequency air pressure changes, and to transmit longitudinal vibrations to said one fibre end, the other fibre end being fixed in position. Such an arrangement is particularly adapted for use in a telephone microphone. Alternatively, a piezoelectric crystal can extend between and be fixed to the fibre ends, with means for applying a high frequency modulating voltage across the crystal to produce changes in width of the crystal with corresponding changes in the spacing of the fibre ends. Alternatively, a curved outer surface portion of one of the fibres can be at least partly coated by a metal layer, the metal layer being surrounded by a coil, with means for applying a high frequency modulating voltage to the coil to induce longitudinal vibration of said end portion, the other fibre end being fixed.

There are also a number of ways of altering the refractive index of material in the space between the fibre ends. For example, the fibre ends can be hermetically sealed within a gas-filled chamber with means, such as a piston and cylinder arrangement, for changing the pressure of the gas to produce a corresponding change in refractive index.

Alternatively, the fibre ends are hermetically sealed within a gas-filled chamber and means are provided for changing the temperature of the gas. Alternatively, an electro-optic crystal extends between and is fixed to the fibre ends and means are provided for applying a high frequency modulating voltage across the crystal to produce a corresponding change in the refractive index of the crystal.

One or both of the fibre ends can be formed with a reflective coating in order to adjust the proportion of incident radiant energy reflected from said fibre ends.

Embodiments of the invention will now be described by way of example with reference to the accompanying drawings in which.

Figure 1A:
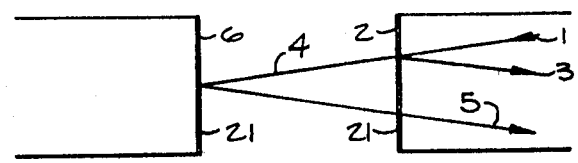
FIGS. 1a and 1b are schematic views of a system embodying the invention.
Figure 1B:
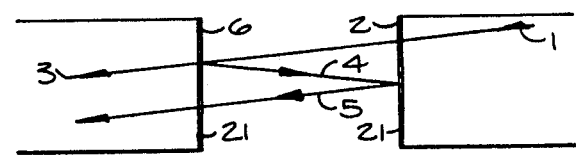

As explained previously, the invention utilizes interference in order to modulate light in a fibre optic telecommunications system. In FIG. 1a, 1 is a light beam which is incident on a partially reflecting surface 2 to produce both a reflected beam 3 and a transmitted beam 4, the beam 4 being itself reflected, 5, from a second reflecting surface 6. As previously indicated, interference re-distributes the pattern of reflected wave energy as compared to incident beam 1. The extent of interference is dependent upon the phase difference between the reflected beams 3 and 5 which is determined by the optical path difference "nd" where "n" is the refractive index of the material through which beam 4 propagates and returns and "d" is the distance between the reflecting surfaces 2 and 6. The optical path difference is kept sufficiently small that there is at least partial coherence between the two reflected beams thereby guaranteeing a measure of interference. Modulation of the combined, reflected light beams 3 and 5 is obtained by varying the optical path length "nd" in accordance with a modulating influence. This can be done either by varying spacing "d" or refractive index "n". Several examples of each are shown in FIGS. 2 to 5. The modulators of these Figures can be used in a reflective (FIG. 1a) or a transmissive (FIG. 1b) mode since the two are complementary. In FIG. 1b, the incident beam 1 is split at partially reflecting surface 6 to produce a transmitted beam 3 and a reflected beam 4, the latter being reflected, 5, at surface 2. Interference occurs between beams 3 and 5. In order that the two components, 3 and 5 (FIG. 1) making up the interfering beam are of comparable intensity the partially reflecting surfaces 2 and 6 are coated with layers 21 of appropriate reflectivity.

Figure 2:
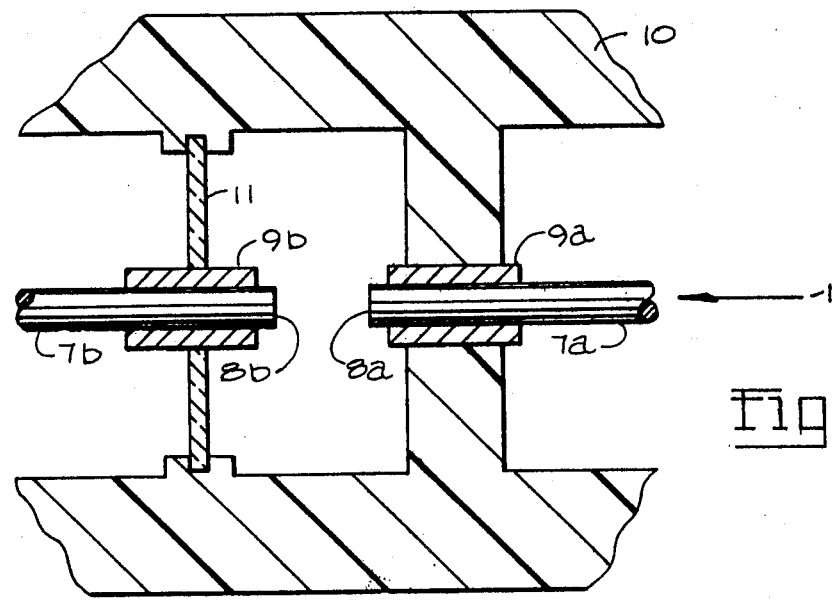
FIG. 2 is a sectional view of part of one embodiment of optical modulator which utilizes periodic changes in spacing of a pair of fibre ends.

Referring to FIG. 2, a pair of fibres 7 are mounted with their ends 8 aligned and highly parallel. An end portion of each fibre is fixed within a ferrule 9. The ferrule 9a is securely fixed within a casing 10. The ferrule 9b is secured to, and extends through the centre of, a fibratable diaphragm 11, the diaphragm being mounted within the casing 10 for vibration in response to voice frequency variation in air pressure. The fibre ends are of the order of 10 μm apart, the diaphragm structure and mounting being such that the fibre end 8b oscillates through a distance of about 0.1 μm in response to the voice frequency vibrations. Light propagating along the fibre 7a is partially internally reflected from fibre end 8a and partially reflected from the fibre end 8b. The difference in optical path lengths of the corresponding beams returning along the fibre 7a is 2nd where n is the refractive index of air within the space between the fibre ends 8 and d is the geometrical spacing of the fibre ends. As the optical path length varies so does interference between the two reflected beams and this is monitored at a remote location (not shown).

Figure 3:
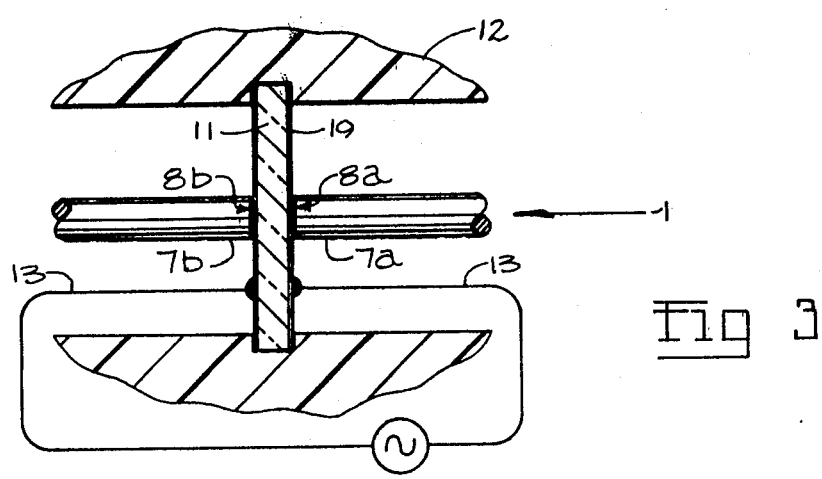
FIG. 3 is a sectional view of another embodiment of optical modulator which utilizes periodic changes in spacing of a pair of fibre ends.

Referring to FIG. 3, a thin wafer of piezoelectric crystal 11 is sandwiched between fibre ends 8a and 8b. The wafer is attached using an index matching cement, the wafer being of the order of 10 μm thick. The crystal extremities are supported within a housing 12. Leads 13 are connected to conductive films 19 extending over opposed faces of the piezoelectric crystal 11, thereby enabling a modulating signal to be applied to the crystal. When a modulating signal is applied, the thickness of the piezoelectric wafer varies in accordance with the applied signal so as to alter the spacing between the fibre ends 8. As previously explained, this produces variation in interference of reflected beams which can be monitored at a remote location. The FIG. 3 embodiment is particularly adapted to high data rate systems.

Figure 4:
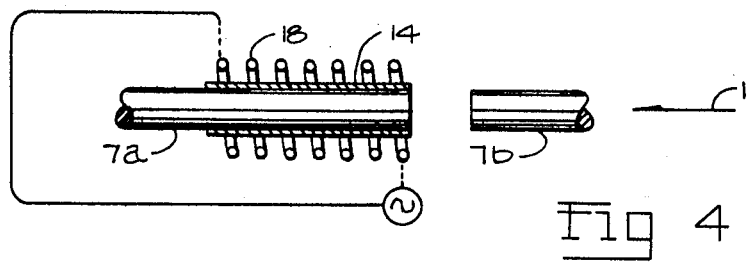
FIG. 4 is a sectional view of yet another embodiment of optical modulator which utilizes periodic changes in spacing of a pair of fibre ends.

Referring to FIG. 4, one of a pair of fibre end portions 7 has an evaporated nickel coating 14, the fibre end portion 7a being free to oscillate longitudinally, the facing fibre end portion 7b being fixed. A coil 18 surrounds the fibre end portion 7a. A modulating signal when applied to the coil produces axial vibration of the fibre end portion 7a thus varying the spacing between fibre ends 8 to produce variation in the interference between the two reflected beams.

Figure 5:
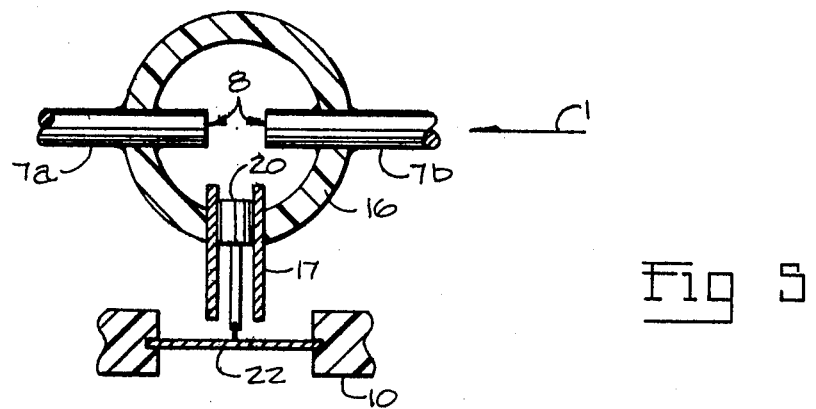
FIG. 5 is a sectional view of one embodiment of optical modulator using periodic changes in refractive index of material in the space between a pair of fibre ends.

Referring to FIG. 5, the end portion of fibres 7 are hermetically sealed into a chamber 16 filled with a gas, the refractive index of which is proportional to pressure. The fibre end portions pass through and are sealed at the chamber walls the end faces 8 being of the order of 10 μm apart. Also extending into the chamber is a cylinder 17 which houses a reciprocal piston 20 actuated by a vibratory diaphragm 22. The diaphragm is mounted within a housing 10 in order to be susceptible to incident voice-frequency pressure variations. Reciprocation of the piston causes changes in the refractive index of gas within the chamber with consequent change in the optical path length between the fibre end faces 8. Periodic changes in the optical path length produce corresponding variation in interference between beams reflected from the two end faces and propagated along the fibre 7b to a monitor (not shown).

In a variation of the FIG. 5 embodiment, (not illustrated), the proportionality of refractive index of a gas to temperature is utilized. Such an arrangement lends itself particularly to use of the device as a heat or radiation detector. In the latter, the chamber is formed with a radiation window through which radiation can pass to be absorbed by and heat the gas within the chamber. The interference between beams reflected from the fibre end faces 8 thus provides an indication of radiation intensity.

In a variation (not shown) of the FIG. 3 embodiment, an electro-optic crystal wafer in which refractive index of the wafer material is proportional to potential difference applied across it, is substituted for the piezoelectric crystal 11.

Figure 6:
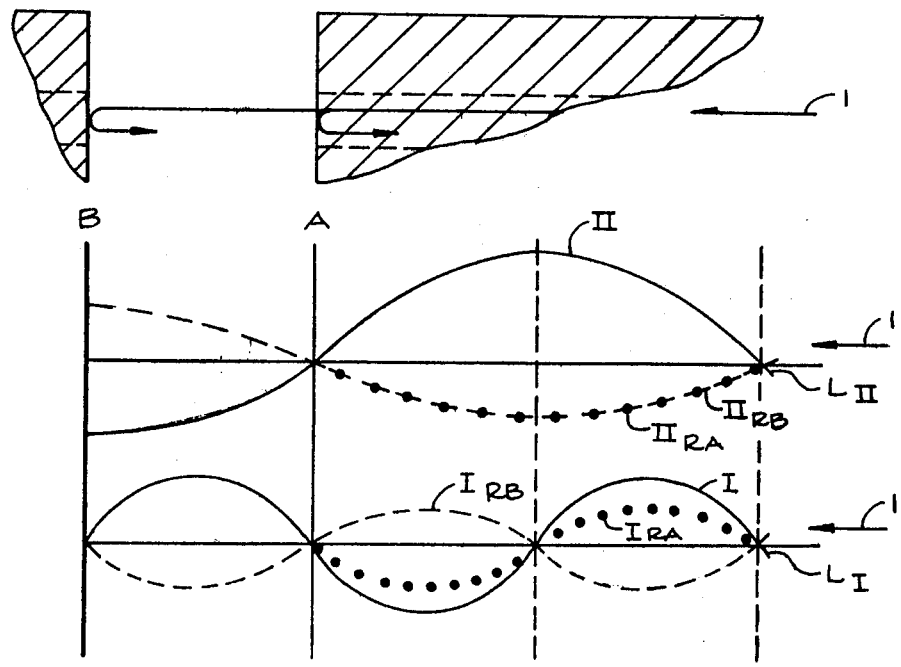
FIG. 6 is a graphical illustration showing how any of the modulators described with reference to FIGS. 2 to 5 may be used in a wavelength division multiplexed system.

Although not limited to such use, the modulators described with reference to FIGS. 2 to 5 can be used in a wavelength division multiplexed system. Thus referring to FIG. 6 there are illustrated graphically the amplitudes of a light wave I, of wavelength λ and a light wave II of wavelength 2λ reflected at surfaces A and B separated by a distance λ/2. For convenience, the amplitudes of the incident waves and resultant reflected waves are shown on separate ordinates. Considering waveform I, a reflected beam $I_{RB}$ from surface B is transmitted across partially reflecting surface A simultaneously with point $L_I$ on the original waveform 1 being incident on surface A. Since a 180° phase shift occurs at reflecting surface A and no phase shift occurs at reflecting surface B, destructive interference occurs. In contrast for waveform II, the phases of the two reflected waves $II_{RB}$, $II_{RA}$ are such that they constructively interfere. Thus if the optical path length between the fiber ends is initially set at λ/2 and is varied slightly about that value according to an impressed modulating signal, there is minimal observable modulation of the destructively interfering waves and maximum observable modulation of the constructively interfering waves. In short, the device can be used to selectively modulate a narrow optical bandwidth or a selected carrier of a multiplexed signal.

This mode of operation is enhanced by suitably coating the end faces of the fibers with reflective coatings to ensure, as far as possible, that the amplitude of a wave component reflected from the surface A is equal to the amplitude of a wave component from the surface B when the two coherent reflected waves combine. This method of operation can be further enhanced by coating the fiber ends with layers of wavelength dependent dielectric materials.

What is claimed is:

1. An optical modulator suitable for a fibre optic telecommunications system, said modulator comprising a pair of contiguous fibres, an end surface of one fibre facing, spaced from, and parallel to an end surface of the other fibre, whereby light directed along one fibre is partly reflected from the spaced fibre ends and is partly transmitted at said spaced fibre ends into the fibre, and means for altering the optical path length between the fibre end surfaces said alteration of optical path occurring in accordance with an applied modulating signal whereby to vary the intensity ratio of the partly reflected and the partly transmitted light.

2. An optical modulator as claimed in claim 1, said means being operable to alter the spacing of the fibre ends.

3. An optical modulator as claimed in claim 2, in which one of the fibres is secured to a membrane housed within a telephone microphone, said one fibre undergoing longitudinal vibration consequent on vibration of the membrane in response to voice frequency air pressure changes.

4. An optical modulator as claimed in claim 2, in which said means comprises a piezoelectric crystal extending between, and fixed to, the fibre ends, and means for applying a high frequency modulating voltage across the crystal to produce corresponding changes in width of the crystal.

5. An optical modulator as claimed in claim 2, having an end portion of one of the fibres at least partly surrounded by a metal layer, the metal layer being surrounded by a coil, and means for applying a high frequency modulating voltage to the coil to induce longitudinal vibration of said one fibre.

6. An optical modulator as claimed in claim 1, said means being operable to alter the refractive index of material through which said optical path extends.

7. An optical modulator as claimed in claim 6, in which an electro-optic crystal extends between the fibre ends and means are provided for applying a high frequency modulating voltage across the crystal to produce a corresponding change in the refractive index of the crystal.

8. An optical modulator as claimed in claim 1, in which the fibre end faces have reflective coatings.

9. An optical modulator as claimed in claim 1 in which at least one of the spaced fibre end surfaces has a wavelength dependent dielectric coating for filtering predetermined wavelengths from optical beams transmitted there-across.

10. A method of operating a modulator as claimed in claim 1, said method comprising directing light along said one fibre to the spaced fibre ends to partly transmit the light into the other fibre, modulating said light by altering the optical path length between the fibre end surfaces said alteration of optical path occurring according to an applied modulating signal, and detecting the transmitted modulated light from the other fibre.

11. A method of operating a modulator as claimed in claim 1, said method comprising directing light along said one fibre to partly reflect the light from the spaced fibre end surfaces, modulating said reflected light by altering the optical path length between the fibre ends said alteration of optical path occurring according to an applied modulating signal, and detecting said reflected modulated light from said one fibre.

12. A method as claimed in claim 11 or 10 particularly for wavelength division multiplexed systems, and in which interfering beams providing said modulated light are made to constructively interfere at a first desired wavelength and to destructively interfere at a second undesired wavelength whereby to obtain wavelength separation.

* * * * *